United States Patent [19]

Matesa et al.

[11] Patent Number: 4,610,711
[45] Date of Patent: Sep. 9, 1986

[54] METHOD AND APPARATUS FOR INDUCTIVELY HEATING MOLTEN GLASS OR THE LIKE

[75] Inventors: Joseph M. Matesa, Plum Boro; Kwang J. Won, Murraysville; Henry M. Demarest, Jr., Natrona Heights, all of Pa.

[73] Assignee: PPG Industries, Inc., Pittsburgh, Pa.

[21] Appl. No.: 656,292

[22] Filed: Oct. 1, 1984

[51] Int. Cl.⁴ .............................................. C03B 5/02
[52] U.S. Cl. ..................................... 65/134; 65/136; 65/335; 65/347; 373/27; 373/34
[58] Field of Search ................... 65/347, 134, 29, 335, 65/135, 136; 373/27, 34

[56]     References Cited

U.S. PATENT DOCUMENTS

| | | | |
|---|---|---|---|
| 1,830,481 | 11/1931 | Northrup . | |
| 1,906,594 | 5/1933 | Hitner . | |
| 2,465,283 | 3/1949 | Schlehr | 65/135 U X |
| 2,485,851 | 10/1949 | Stevens | 13/6 |
| 3,205,292 | 9/1965 | Descarsin | 13/6 |
| 3,244,494 | 4/1966 | Apple et al. | 65/136 |
| 3,244,495 | 4/1966 | Apple et al. . | |
| 3,461,215 | 8/1969 | Reboux | 13/27 |
| 4,381,934 | 5/1983 | Kunkle et al. | 65/135 |
| 4,521,238 | 6/1985 | Heithoff | 65/27 X |

FOREIGN PATENT DOCUMENTS 1430382  3/1976  United Kingdom .

OTHER PUBLICATIONS

Baker, "Design and Calculation of Induction Heating Coils", Am. Inst. of Elec. Engrs. Trans., vol. 76, Part 2, Mar. 1957, pp. 31-40.
Scott et al., "Techniques for Producing Low Loss Glasses for Optical Fiber Communications Systems", Glass Technology, vol. 14, No. 5, Oct. 1973, pp. 115-124.
Descarsin, "Fusion et Faconnage du Verre Courants de Tres Haute Frequence", Bul. de l'Institute du Verre, No. 1, Mar. 1946, pp. 17-31 (with translation).
Moulin et al., "Nouveaux Developpements dans la Fusion Electrique des Verres Refractaires", Verres Refract., vol. 26, No. 4-5, Jul.-Oct. 1972, pp. 123-127, (with translation).
Gibbs et al., "The Present and Future Developments of Electric Heating Techniques in the Glass Industry", 9th International Congress, Comite Francais d'Electrotherme, Oct. 1980, Session No. 8.

Primary Examiner—Arthur Kellogg
Attorney, Agent, or Firm—Dennis G. Millman

[57]     ABSTRACT

Glass or the like is melted by liquefying batch materials in a first stage by means of radiant heating, and further advancing the melting process in a second stage where the melt is heated by induction heating. Another aspect of the invention provides a residence zone at the exit of the induction heating stage to aid elimination of gaseous inclusions.

24 Claims, 6 Drawing Figures

METHOD AND APPARATUS FOR INDUCTIVELY HEATING MOLTEN GLASS OR THE LIKE

BACKGROUND OF THE INVENTION

This invention relates to electrically heating a body of molten material such as glass by means of induction. The invention is applicable to the melting of a material which is susceptible to having electric currents induced therein, and it is particularly applicable to the melting of glass or the like.

It is well known that material may be heated by induced currents when the material is placed within a coil carrying alternating current. An advantage of this type of heating is that the material being heated does not come into contact with the electrical source; e.g., electrodes need not be immersed in the melt. The general concept of inductively heating glass has been disclosed in many patents, for example U.S. Pat. Nos. 1,830,481; 1,906,594; 3,205,292; and 3,244,495. Much of the prior art is limited to small scale embodiments, and large-scale melting of glass by induction heating has not found significant commercial acceptance. The economics of induction heating, however, have not favored its use in the large scale melting of glass and the like. Thermal energy from combustion of fuel has generally been more economical than electric energy for glass melting. Moreover, induction heating has sometimes been considered to entail low efficiency in transferring electrical power into thermal energy. Also, it has been the belief of some in the art that large scale induction heating of glass would entail a prohibitively large induction coil.

SUMMARY OF THE INVENTION

Liquefaction of batch materials can be carried out more economically in an ablating type melter of the type disclosed in U.S. Pat. No. 4,381,934 than in an induction heater. Combusion heating depends upon a large temperature difference between the heat source and the material being heated to effectively transfer heat. Initially liquefying batch materials provides a large temperature difference and thus lends itself to combustion heating. The technique of the aforesaid patent reinforces this advantage by enhancing run-off of hot, liquefied material and continually exposing cold batch to the radiation, thereby maintaining a large temperature difference. Completing the melting of the liquefied material, however, involves raising the temperature of an already hot material, and therefore does not provide as great a temperature difference. Induction heating, on the other hand, does not require a temperature difference to transfer energy to the suscepting material. Therefore, induction heating is ideally suited for the second stage of a melting process. In comparison with a total energy consumption of about 6 million BTU's per ton to melt soda-lime-silica flat glass in a large scale continuous furnace, a thermal input of only about 0.5 million BTU per ton (28.6 kcal per kg.) need be applied to the glass in the induction heater to perform the refining function. In the present invention, the major portion of the energy is expended in the more economical liquefying stage, and the size of the induction heater and the amount of electrical energy consumed can be minimized by employing induction heating as the second stage, or "refiner," of the melting process.

There are other advantages to feeding material to the induction heater in a pre-liquefied state. In a continuous process such as this, it is desirable to establish stable circulation patterns of the molten material within the induction heating vessel. But feeding cold materials to the top of the vessel may conflict with the naturally rising thermal convection currents and thus could lead to instabilities. Furthermore, providing molten material at the top of the vessel is consistent with the goal of removing bubbles from the melt.

THE DRAWINGS

DETAILED DESCRIPTION

The principles of the present invention are applicable to the inductive heating of a wide variety of molten materials, but the detailed description will relate primarily to an embodiment specifically designed to melt glass. Additionally, the specific embodiment to be described is adapted for continuous throughput at relatively high rates. The present invention is particularly advantageous under those conditions but is not limited thereto.

Figure 1:
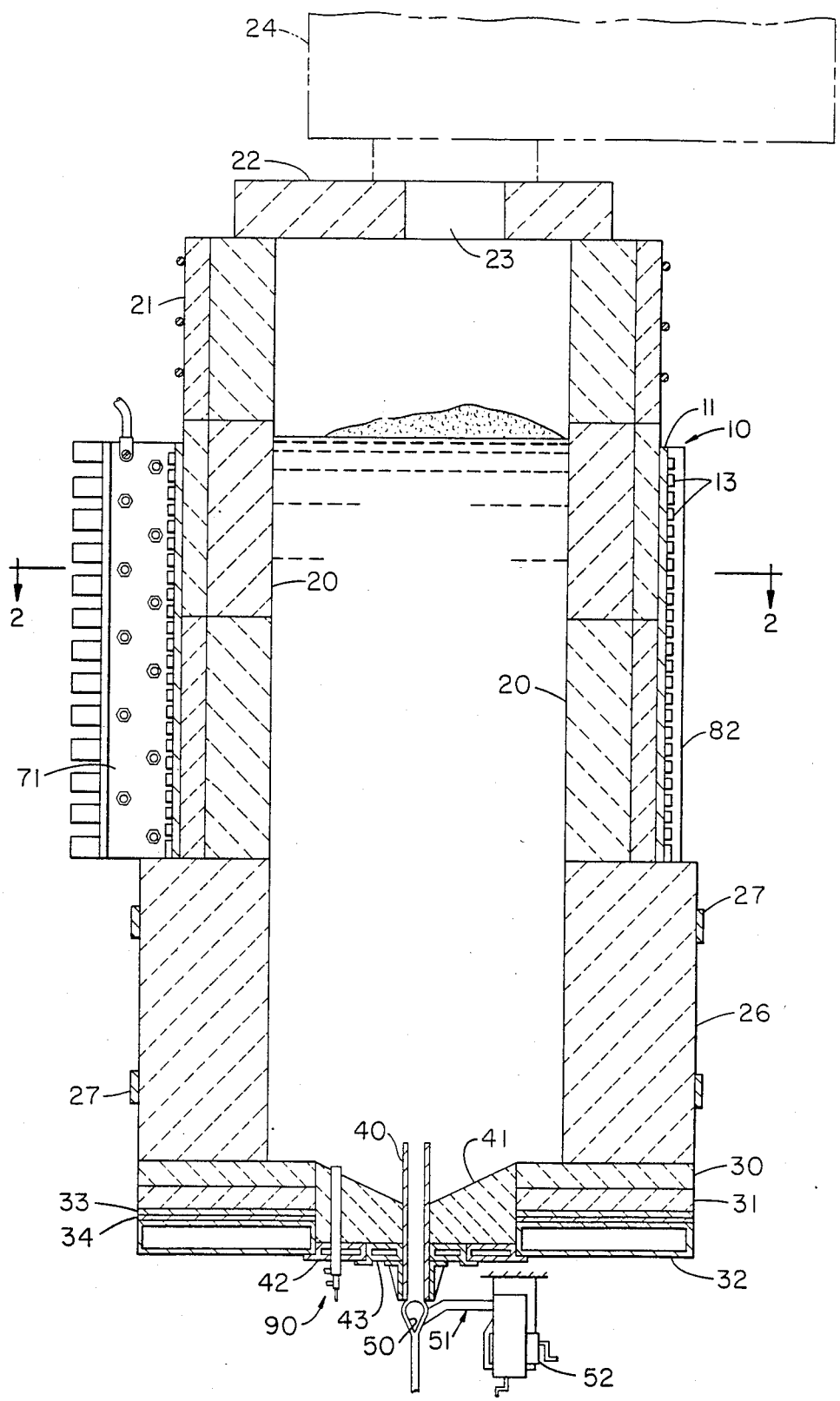
FIG. 1 is a vertical cross-sectional view of a preferred embodiment of an induction heating apparatus in accordance with the present invention.
Figure 2:
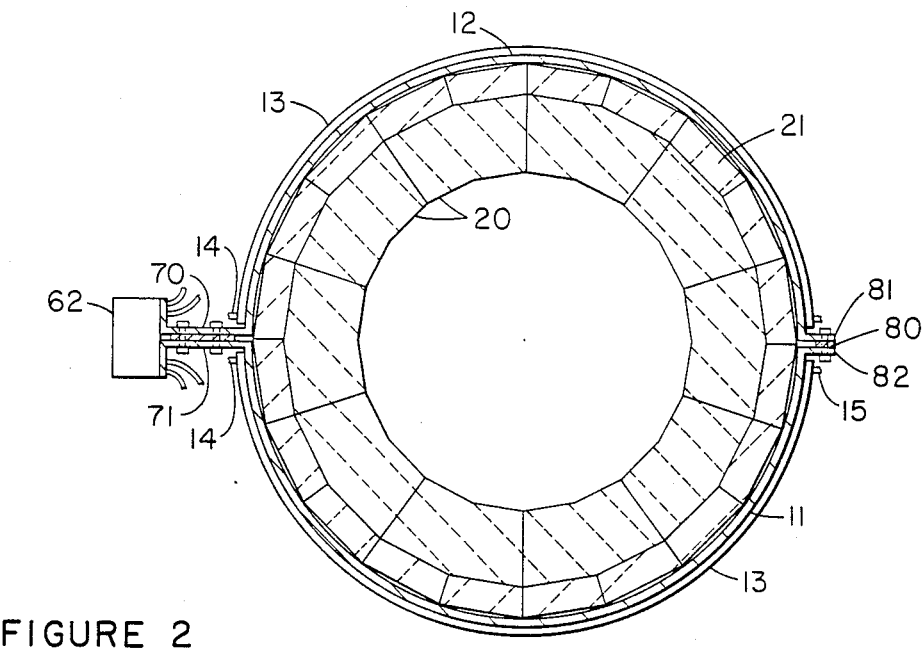
FIG. 2 is a horizontal cross-sectional view of the apparatus of FIG. 1 taken along line 2—2 in FIG. 1.

In the embodiment depicted in the drawings, referring in particular to FIGS. 1 and 2, a single turn induction coil 10 is comprised of two half cylinders 11 and 12 surrounding a portion of a cylindrical ceramic vessel. Copper is the preferred material for the coil because of its high electrical conductivity. The thickness of the cylindrical portions 11 and 12 will depend upon the strength requirements of a particular application, but for the particular example being described, a thickness of ¼ inch has been found adequate. To the outside of the cylindrical portions 11 and 12 are welded a plurality of cooling tubes 13. Water or other cooling fluid may be supplied to the tubes 13 by way of non-conductive tubes 14. The cooling fluid travels a semi-circular path around one side of the cylinder to an outlet tube 15 by which the fluid may be passed to a drain or to another cooling tube 13 on the same side of the cylinder for a return passage along a second semi-circular path. Depending upon the size of the vessel and the cooling requirements, the cooling fluid may be passed through additional tubes before being passed to a drain.

In the induction heating zone the vessel is comprised of a cylinder formed by a plurality of refractory blocks 20. The cylindrical configuration is the most efficient and therefore preferred, but it should be understood that other shapes could be employed. The cylinder may be formed from a plurality of courses of the blocks 20, and within each course there may be a plurality of wedge shaped blocks forming a circle or polygon. For example, in the particular embodiment depicted in FIG. 2, there are three courses of the blocks 20, with each course comprised of ten blocks, each having two facets so as to create a twenty-sided polygon. The blocks 20 are a refractory material selected for compatibility with the molten material being processed. In the case of melting glass, a suitable refractory is the alumina-zirconia-silica type of refractory. This type of refractory is suitable for contact with molten glass, but its thermal insulating properties are relatively poor compared to other types of refractory ceramic materials. Accordingly, the thickness of a block 20 in the radial direction is sufficient to provide a temperature gradient between its inner face and its outer face so that any molten material that may escape through the joints or cracks would become solidified or at least very viscous before it reaches the outer face of the blocks 20. In the case of glass, a suitable temperature gradient provides a temperature at the outer face of the blocks 20 no higher than the devitrification temperature of the particular glass being melted. With a typical commercial soda-lime-silica flat glass composition, such a temperature would be about 1800° F. (about 980° C.). Even better containment could be achieved with an outer temperature near the softening point of glass—about 1400° F. (750° C.). Additionally, the refractory of the inner blocks 20 should have relatively high electrical resistivity at elevated temperatures so that the refractories suscept little of the induced electrical currents. By way of example, satisfactory results may be obtained with a refractory whose resistivity is on the order of five to ten times that of the resistivity of the molten material being treated. Although not essential to the principle of the invention, another feature that may be desirable is that the refractory be of a type which is capable of being cycled repeatedly between room temperature and the operating temperature.

On the outside of the refractory cylinder defined by the blocks 20 is an outer refractory cylinder comprised of a plurality of blocks 21. The blocks 21 are a ceramic refractory material selected for its insulating properties, i.e., having a relatively low coefficient of thermal conductivity. The outer blocks 21 have lower thermal conductivity than the inner blocks 20, typically on the order of less than one-half that of the inner blocks, and preferably less than about one-fifth. Because isolation from the molten material within the vessel is provided by the thickness of the inner refractory cylinder, the outer refractory pieces 21 need not be adapted for contact with the molten material, although the provision of some compatibility at relatively moderate temperatures is preferred. An example of a suitable material for the outer insulating refractory layer is a porous (low density) clay refractory. Because of its low thermal conductivity, the insulating layer can achieve the objective of providing an additional thermal gradient compatible with contact of the metallic induction coil on its outside surface while at the same time adding minimal additional thickness to the vessel wall. Minimizing overall wall thickness is desirable for maximimizing power efficiency by placing the coil as close as possible to the material being treated and by minimimizing the amount of material within the coil in which stray currents may be induced. The coil temperature should be maintained sufficiently low to prevent substantial oxidation of the metal, to minimize electrical resistance of the copper, and to prevent undue loss of strength. Cooling coils 13 help maintain the coil temperature low, and the thermal gradient provided by the outer layer of refractory 21 should be sufficient to maintain the cooling requirements and energy losses to a reasonable level. When the coolant is water, as is preferred, the coil temperature and thus the outside surface temperature of the outer refractories 21, is preferably maintained below 100° C.

The construction of the portion of the vessel above the induction coil is not as critical as that within the induction coil, but as a matter of convenience, the same construction may be continued to the top of the vessel as depicted in FIG. 1. A refractory lid member 22 may be provided at the upper end of the vessel through which is provided a feed opening 23. Raw materials may be fed through the opening 23, but at least in the case of glass, it is preferred that the raw materials be liquefied in a preceding stage of the melting process. A preferred liquefying process is that disclosed in U.S. Pat. No. 4,381,934 of Kunkle et al. A suitable surge hopper 24 or the like may be provided for holding material to be fed to the induction heating vessel.

The thickness of the wall 26 of the vessel below the induction coil is not critical, but non-contaminating contact with the molten material remains an important consideration. Therefore, it is preferred that the lower wall portion 26 be made of a refractory suitable for contact with the molten material (alumina-zirconia-silica type refractories in the case of glass) and the wall may be provided with whatever thickness provides the desired thermal insulation. As in the other portions of the vessel, the lower portion 26 may be fabricated from a plurality of wedge-shaped refractory blocks. Binding straps 27 or the like (preferably of stainless steel to minimize ferro-magnetism) may be provided around the lower portion of the vessel to retain the blocks in position without undue loss of power due to stray currents being induced in the binding straps. Power losses in the straps 27 can be further reduced by minimizing the cross-sectional area of the metal, by locating them below the induction coil as far as possible, and by breaking each strap into a plurality of electrically insulated segments along its length.

The floor of the vessel is also comprised of refractories suitable for contact with the molten material. Details of the bottom construction may be seen in the enlarged view of FIG. 3. The upper layer 30 of the bottom structure is preferably a refractory suitable for contact with the molten material such as alumina-zirconia-silica-type refractories in the case of glass melting. Beneath the layer 30 may be provided a second layer 31 of a material chosen for its thermal properties such as a low density clay refractory. Cooling is provided on the outside of the bottom structure so as to assure containment of the molten material in the vessel. In the embodiment depicted, an annular water cooler 32 forms the base for the vessel. Between the water cooler 32 and the refractory layer 31, there may be provided a layer of refractory paper 33 and a copper sheet 34 which serves to shield the water cooler 32 from stray induced currents, particularly if the cooler is made of mild steel.

Figure 3:
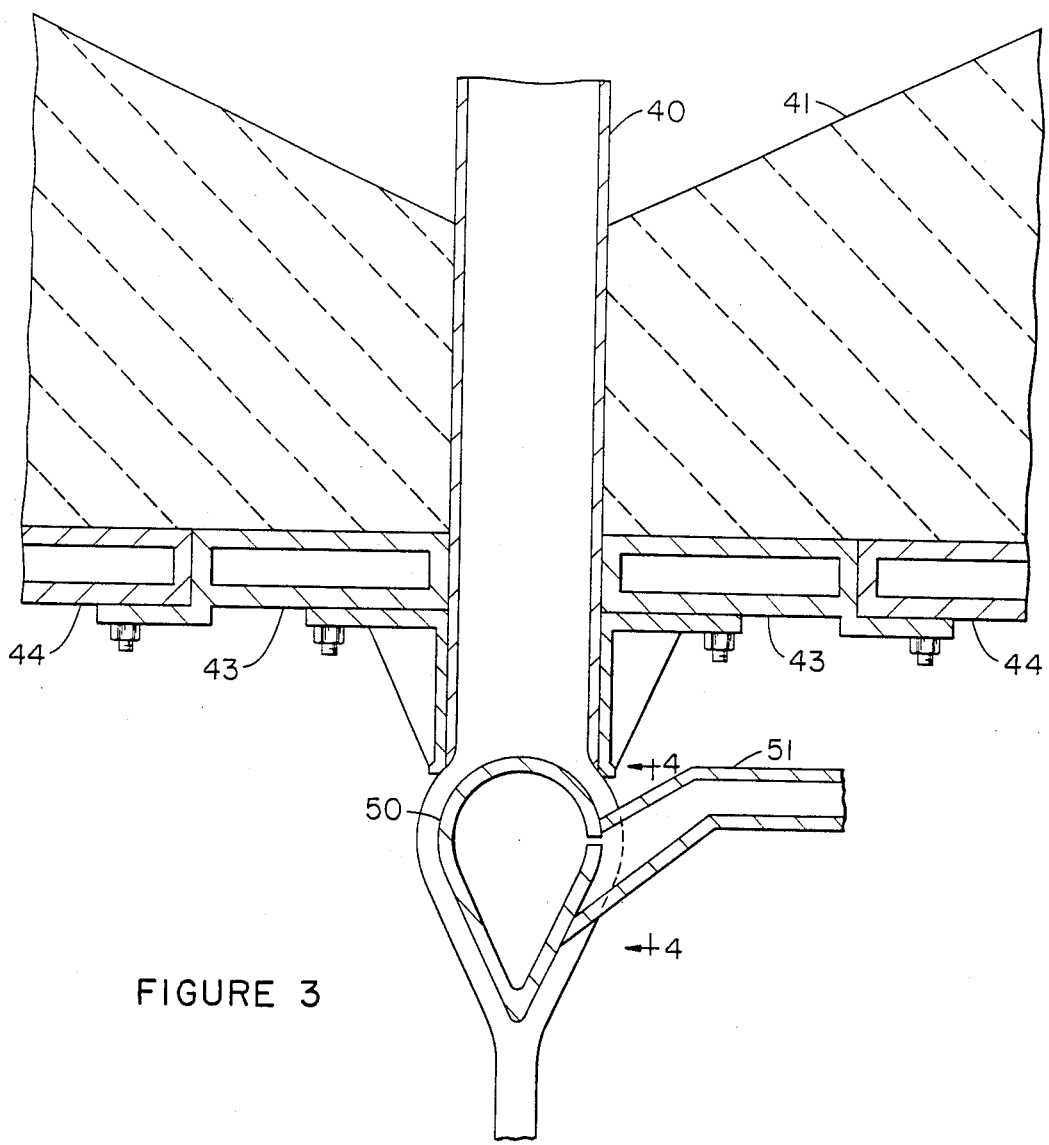
FIG. 3 is an enlarged cross-sectional view of the bottom portion of the vessel of FIG. 1, showing details of a drain and metering means.

Various arrangements for draining molten glass or the like from the vessel are known in the art and may be used with the present invention, but a particularly advantageous drain arrangement is shown in the drawings, with particular reference to FIG. 3. The drain is comprised of a refractory metal (e.g., platinum-rhodium alloy) tube 40 mounted in the center of the bottom of the vessel. The tube 40 extends through a central refractory piece 41 which is preferably a refractory suitable for contact with the molten material. The tube 40 extends above the bottom surface of the vessel to prevent any debris at the bottom of the vessel from being carried into the output stream. The refractory bottom section 41 slopes downwardly toward the tube 40 so as to provide less refractory thickness and thus less insulation near the tube, thereby maintaining relatively high temperatures within the tube so as to prevent freezing of the molten material within the tube. Additional coolers 42 and 43 are provided under the center refractory section 41 and around the tube 40 so as to insure positive containment of the molten material.

Figure 4:
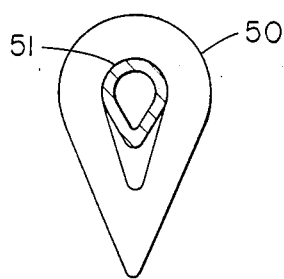
FIG. 4 is a cross-sectional view of a support arm for the metering means, taken along line 4—4 in FIG. 3.

Various means are known in the art for controlling the flow of molten material such as glass through a gravity fed drain. Many of these arrangements involve manipulating the viscosity of the material by variably heating or cooling the drain tube. An induction coil associated with a drain tube is a typical example. In some cases these approaches may be employed satisfactorily with the present invention, but they possess certain drawbacks in the large scale melting of glass. The quantity of heat in a rapidly flowing stream of glass (e.g., on the order of hundreds or thousands of kilograms per hour) is so great that it is difficult to significantly influence the viscosity of the stream by heat transfer through walls of a drain tube. On the other hand, when adequate heat exchange is provided to effect control of the flow rate, the sensitivity of glass viscosity to temperature makes it difficult to finely modulate the flow rate. Physical flow restricting means ("plungers") are well known in the art for controlling molten glass flow. A typical plunger arrangement involves structural elements within the melting vessel that interact with the upper end of a drain orifice. Such an arrangenent would not be suitable for an inductively heated vessel as in the present invention. Accordingly, a preferred arrangement for controlling the molten glass flow in the present invention involves exterior flow obstruction means interacting with the lower end of the drain tube. A particularly advantageous arrangement is that shown in the drawings whereby a streamlined "teardrop" shaped element 50 is supported slightly spaced below the drain tube 40 so as to form an annular opening therebetween through which a stream of molten glass flows. By varying the vertical position of the element 50, the size of the annular opening may be varied, and thus the flow rate of the molten glass controlled. The flow control element 50 is supported by a horizontally extending arm 51 which is, in turn, mounted on positioning means 52 which may conveniently be a machinist's milling table or the like, preferably having three-dimensional adjustability. In order to maintain a coherent stream of glass, the flow control device is shaped to encourage converging flow patterns. The molten glass flowing around the element 50 recombines to a single stream by flowing along the converging surfaces of the lower portion of the element. Additionally, the portion of the arm 51 within the molten glass stream may be provided with an inverted teardrop shape as shown in FIG. 4, and is inclined downwardly along its length to prevent the creep of molten glass onto the arm. Thus shaped, the device causes minimal disturbance to the striae of the flowing glass. The device is capable of positive flow control over a wide range from a positive shutoff at the uppermost position to essentially a wide open setting when lowered a few centimeters below the drain tube. It may be noted that the term "teardrop" as used herein, is not limited to a strict definition of the term, but may include a wide variety of streamline shapes that taper to a narrow portion at the bottom. For ease of fabrication the teardrop is preferably comprised of a cone joined to a hemisphere. Other variations may entail non-circular horizontal cross-sections or non-spherical upper portions. For contact with molten glass, the teardrop 50 and arm 51 are preferably fabricated from molybdenum clad with a platinum-rhodium alloy. It is contemplated that the core may be made of a less noble metal than molybdenum or even of ceramic refractory materials and clad with precious metal and provided with internal cooling if necessary.

Figure 5:
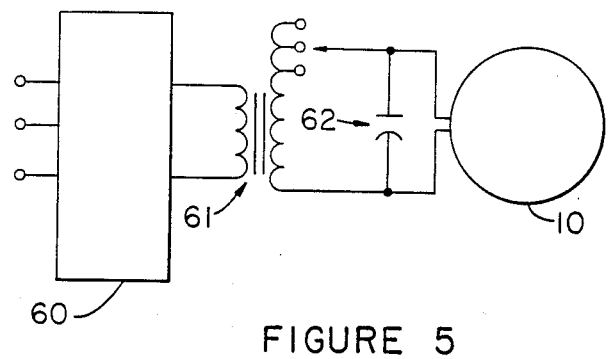
FIG. 5 is a schematic diagram of the electric circuit involved in the induction heater of the present invention.

A schematic diagram of the electrical system for the induction heater is shown in FIG. 5. A typical industrial electrical power supply of three-phase 60 Hz alternating current is connected to an inverter 60 which delivers a high frequency, single-phase output to a transformer 61. The transformer 61 is preferably provided with a plurality of taps on its secondary so as to permit the voltage to the induction coil 11 to be varied as needed. The induction coil 11 is wired across the secondary of the transformer 61 in parallel with a capacitor 62. The capacitor 62 and the coil 11 establish a resonant circuit therebetween having high frequency and high amperage, thereby permitting the use of a small number of induction coil turns, e.g., one. The high amperage leads to high magnetic flux in spite of the small number of coil turns, thus providing the coil with substantial induction capabilities. Alternatively, magnetic flux could be increased by increasing the number of coil turns, but higher voltages would be required which would disadvantageously impose restrictions on the kind of inverter that could be used. With frequencies up to about 10 kHz, solid state inverters can be employed which have relatively high conversion efficiency and low cost. Typically, a plurality of capacitors in parallel with each other would be employed to provide the desired total capacitance. The frequency and capacitance of the resonating circuit can be described by the following equation:

$$f = 1/[2\pi(LC)^{\frac{1}{2}}]$$

where:
f = the resonant frequency (Hz);
L = inductance of the coil (henrys);
C = capacitance (farads).

Other design calculations for induction heating coils are set forth by R. M. Baker in American Institute of Electrical Engineers Transactions, Vol. 76, Part 2, 1957, pp. 31–40.

Figure 6:
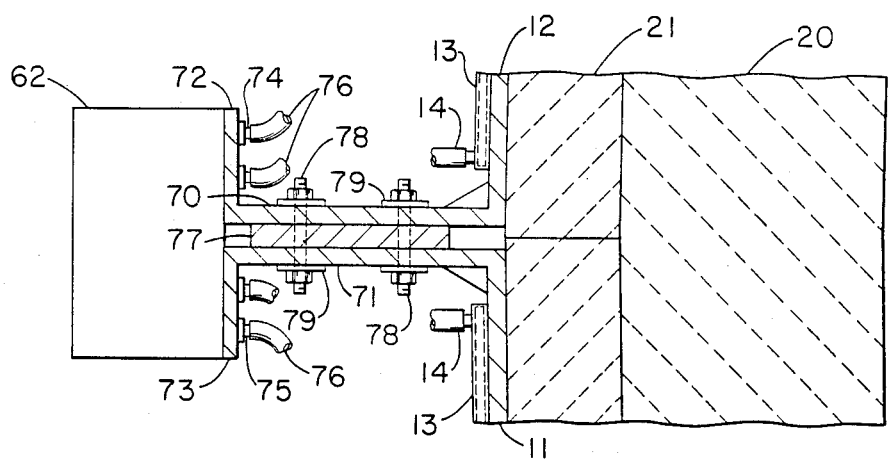
FIG. 6 is an enlarged view of the coil terminal portion of FIG. 2.

FIG. 6 shows one form of capacitor 62, in this case a water-cooled capacitor mounted across the legs of the induction coil 11. In this configuration, the capacitor 62 is one of several which may be mounted above one another in a vertical row spanning the gap in the induction coil. On each side of the gap in the induction coil 11, there are radially extending legs 70 and 71 provided at their outer ends with flanges 72 and 73, respectively, to which the capacitors 62 are mounted. Threaded terminal posts 74 on one side of each capacitor are associated with one pole of the capacitor and are connected to the flange 72 on one side of the coil, and terminals 75 on the other side of the capacitor associated with the opposite pole thereof are connected to the flange 73 on the other side of the induction coil. The terminals 74 and 75 are tubular and are connected to coolant hoses 76 which provide coolant to the internal cooling means of each capacitor 62. The legs 70 and 71 of the induction coil are electrically insulated from each other by means of an insulation shim 77. Since the cylindrical induction coil 11 serves as binding for the refractory vessel, it is maintained in tension by means of bolts 78 which bias the legs 70 and 71 toward one another. Non-conductive bushings 79 may be provided around the bolts 78 to maintain the electrical isolation of the legs from each other. Similarly, on the other side of the coil, the two half cylinders of the coil are bolted together with a conductive shim 80 between radially extending flanges 81 and 82. The empty vessel is initially heated up using auxiliary heaters and with the induction coil turned off. As the refractory portions of the vessel expand as they become heated, the binding tension of the cylindrical coil 11 is progressively released by turning the bolts to enlarge the gap between the cylinder halves at either one or both of the joints therebetween. Initially the legs 70 and 71 and the flanges 81 and 82 may be in contact with each other, and the shims 77 and 80 inserted after the vessel has been preheated to operating temperature. Then current may be applied to the coil.

Resistivity of molten glass varies with temperature, but a typical value is about 6 to 14 ohm-centimeters, which is high relative to materials to which induction heating is more conventionally applied. This leads to certain advantage in designing an induction heating system for glass melting. The current penetration depth in the material being heated is a key factor in the design of an induction heating system. Conventionally, it is recommended that the diameter of the material being heated be about three times the current penetration depth, (see, for example, British Patent Specification No. 1,430,382) but with molten glass, it has been found that induction heating may be efficiently coupled to a body of molten glass whose diameter is equal to or less than the current penetration depth. Current penetration depth may be calculated as follows for glass:

$$d = 5033(\rho/f)^{\frac{1}{2}}$$

where,
 d = current penetration depth in centimeters;
 $\rho$ = resistivity in ohm centimeters;
 f = frequency in Hertz.

Heretofore it has been believed that induction heating of glass would require a huge coil or very high frequencies, either of which made the concept economically unattractive. But now, the implication of the low ratio between work diameter and current penetration depth is that the glass-containing vessel may be relatively compact and yet provide efficient transfer of power to the glass, and that relatively low frequencies can be employed (e.g., less than 10 kHz). If the vessel size is increased, the frequency can be lowered even further.

Some theoretical aspects of induction heating as applied to melting glass are discussed by B. Scott and H. Rawson in Glass Technology, Vol. 14, No. 5, October 1973, pp. 115-124.

A conventional expedient in induction coil design is that the length of the coil be equal to or greater than its diameter, and that expedient is found applicable to the present invention as well. Effective transfer of power to the melt has been obtained with a coil length equal to its diameter, but a more efficient transfer of power may be possible with a longer coil length. The inside diameter of the refractory vessel is determined by anticipated throughput rates and residence time requirements. The composite vessel wall structure described herein provides compact containment of the melt and establishes the outside diameter of the vessel which is in essence the same as the dianeter of the induction coil. Minimizing the difference between the interior diameter of the vessel and the coil diameter results in advangages in that the magnetic flux is more usefully employed for inducing currents in the melt, thereby permitting the use of a single-turn coil with practical amperage requirements. For a given volume, it is generally desirable to minimize the height of the vessel so as to minimize the area for heat loss through the walls. The height of the vessel would normally correspond approximately to the coil length so as to locate the material being heated in the region of maximized magnetic flux. It is preferred for the melt to be provided with additional depth slightly above and below the coil. When melting glass, it has been found particularly advantageous to provide additional depth below the coil to create residence time for the molten glass after passing through the peak temperature within the coil region and before being drained from the vessel. This additional residence time is advantageous to permit bubbles to escape from the melt and, in some cases, to permit the glass to cool to a temperature more consistent with the requirements of a forming process to which the molten glass may be supplied. A residence time of approximately 1 hour below the coil has been found to be advantageous. Expressed structurally, the inside depth of the vessel below the coil may be on the order of at least one-half of the coil diameter.

Glass becomes a significant susceptor of induced currents only at elevated temperatures. For example, soda-lime-silica glass becomes a susceptor at reasonable voltages above 2200° F. (1200° C.). Therefore, the induction heating process is initiated by providing a body of molten glass by auxiliary heating means. Once the glass is susceptive (at a resistivity preferably less than about 14 ohm-centimeters) unheated raw glass batch materials could be fed to the induction heater and melting could be performed entirely therein. However, it is preferred to liquefy the glass batch in a separate stage and to feed the liquefied material to the induction heater at a temperature at which the material is capable of suscepting. In that case, the function of the induction heater is to raise the temperature of the glass so as to complete the melting process and, in particular, to refine the glass, that is, to expel gaseous inclusions from the melt. For soda-lime-silica glass of flat glass quality, refining typically entails a temperature of at least about 2600° F. (1425° C.). Different materials may liquefy at different temperatures, but soda-lime-silica glass typically liquefies and may be fed to the induction heater at a temperature of about 2200° F. (1200° C.) to about 2400° F. (1315° C.), at which temperature the material is susceptible to induced currents.

Sulphur compounds, usually sodium sulfate ("salt cake") have conventionally been included in glass batches to assist in the melting and refining. Because the decomposition products of the sulpur compounds are highly volatile, the sulphur compounds have been added to glass batches in amounts considerably in excess of that theoretically required so that some of the sulphur survives the early stages of melting and is present in the melt to assist during the refining stage. Because of their decomposition into gaseous products, the sulphur compounds are a significant source of undesirable emissions from a glass melting operation. Therefore, efforts have been made in recent years to minimize the amount of sulphur used in glassmaking. It is an advantage that glass can be melted and refined by means of the present invention without the use of sulphur additions to the batch. However, the presence of some sulphur is believed advantageous during the refining process, and it has been found that the present invention, when operated as a two-stage liquefaction and refining process, is capable of retaining a high percentage of its sulphur content in the melt so as to be present in the refining stage. This is believed to be due to the rapidity with which the batch can be liquefied in a specialized liquefaction stage so that less sulphur is lost through volatilization, and more of the sulphur is carried into the refining vessel. Therefore, only a small addition of sulphur to the batch can yield the advantages of refining in the presence of sulphur. It has been found that 3 parts by by weight or less of salt cake per 1000 parts by weight of sand in the batch can provide significant amounts of sulphur in the inductively heated refining zone of the present invention. On the other hand, it has been found that salt cake in amounts greater than 3 parts by weight per 1000 parts by weight sand can produce excessive foaming in the inductively heated vessel. Two parts salt cake per 1000 parts sand is preferred.

Optionally, a bubbler, such as water cooled bubbler tube 90 shown in FIG. 1, may be provided at the bottom of the induction heating vessel. Such a bubbler may be used if the need arises to induce greater circulation of hotter melt into the cooler lower region so as to prevent undue cooling of the lower region that might in turn cause the rate of draining through tube 40 to be reduced unacceptably.

EXAMPLE

In a vessel substantially as depicted in the drawings, 10 tons per day (9,000 kg per day) of soda-lime-silica glass was successfully processed. The induction coil had a diameter and height of 60 inches (1.5 meters) with the bottom of the coil 40 inches (1 meter) above the bottom of the refractory vessel. The level of molten material in the vessel was maintained at about 4 inches (10 centimeter) above the top of the induction coil. The inner layer of refractory was Citeron AZS refractory sold by Combustion Engineering Company and was provided with a thickness of 10 inches (25 centimeters). The outer refractory was Finsulation low density clay refractory sold by Findley Refractories Company and provided with a 2 inch (5 centimeter) thickness. The thermal conductivity of the outer refractory under operating conditions is estimated to be about one tenth that of the inner refractory. The coil was $\frac{1}{4}$ inch (6 millimeters) thick copper. Glass batch was pre-liquefied and fed to the induction heating vessel at a temperature of about 2300° F. (1260° C.) and within the region of the coil, peak temperatures of about 2800° F. (1540° C.) were attained. In the region below the coil, glass temperatures fell to about 2600° F. (1425° C.) before being drained from the vessel. When operation was stabilized, the coil was being supplied with about 110 kw at 650 volts RMS and a frequency of 9.6 kHz.

The detailed description herein has related to specific embodiments for the sake of disclosing the preferred mode of the invention, it should be understood that other modifications and variations are known to those skilled in the art, may be resorted to without departing from the spirit and scope of the invention as defined by the claims which follow.

We claim:
1. A method for melting material comprising:
   feeding a stream of pulverulent material to a first vessel in which the material is supported on a sloped surface and liquefied by primarily radiant heat transfer,
   draining the liquefied material from the first vessel to a second vessel, in the second vessel increasing the temperature of
   the liquefied material by imposing an alternating electromagnetic field on a volume of the liquefied material held in the second vessel so as to induce electric currents in the liquefied material.
2. The method of claim 1 wherein the majority of the thermal energy for melting the material is imparted to the material prior to its entry into the second vessel.
3. The method of claim 1 wherein the material that is melted comprises glass making materials.
4. The method of claim 1 wherein the liquefied material in the second vessel comprises molten glass.
5. The method of claim 1 further comprising continuously draining the liquefied material from the second vessel.
6. The method of claim 5 wherein the liquefied material is drained from the bottom of the first vessel and from the bottom of the second vessel.
7. The method of claim 1 wherein the step of increasing the temperature of the liquefied material is carried out in a first zone of the second vessel, and thereafter the liquefied material is passed to a second zone of the second vessel where the material resides for a period of time without further temperature increase.
8. The method of claim 7 wherein the liquefied material is passed vertically from the first zone to the second zone.
9. The method of claim 7 wherein the temperature of the liquefied material is decreased in the second zone.
10. The method of claim 7 wherein sufficient residence time is provided for the liquefied material in the second zone for escape of gaseous inclusions from the liquefied material.
11. The method of claim 10 wherein the average residence time of liquefied material in the second zone is at least one hour.
12. The method of claim 3 wherein the liquefied material enters the second vessel at a temperature of 2200°–2400° F. (1200°–1320° C.).
13. The method of claim 12 wherein the temperature of the liquefied material in the second vessel is increased to 2600°–2800° F. (1420°–1540° C.).
14. The method of claim 1 wherein the pulverulent material comprises glass batch having a sulfur content equivalent to no more than 4 parts by weight per 1000 parts by weight sand.
15. The method of claim 1 wherein the electromagnetic field is produced by passing alternating current through a coil extending around the second vessel.
16. The method of claim 15 wherein the frequency of the alternating current is no more than about 10 kHz.
17. The method of claim 16 wherein the coil has a single turn.
18. Apparatus for melting materials comprising:
   a first vessel having means for feeding a stream of pulverulent material, a sloped surface adapted to receive the incoming stream and to drain liquefied material from the vessel, and radiant heating means for liquefying the pulverulent material fed to the vessel; and a second vessel adapted to receive liquefied material drained from the first vessel, and having means to impose an alternating electromagnetic field on liquefied material held in the second vessel so as to increase the temperature of the liquefied material.

19. A method for melting material comprising:

initiating melting of pulverulent material by heating the batch material by primarily radiant heat transfer so as to liquefy the batch material to an incompletely melted state; and draining the incompletely melted material from the region of radiant heat transfer to a separate zone, and continuing the melting of the liquefied material in the separate zone by increasing the temperature of the liquefied by imposing an alternating electromagnetic field on a volume of the liquefied material held in the separate zone so as to induce electric currents in the liquefied material.

20. The method of claim 19 wherein the majority of the thermal energy for melting is imparted to the material by the radiant heating step.

21. The method of claim 19 wherein the melting of the batch material yields glass or the like.

22. The method of claim 19 wherein the radiant heat is produced by combustion.

23. The method of claim 19 wherein the liquefied material flows from the zone of radiant heating in an incompletely melted state.

24. The method of claim 23 wherein the material is retained for a sufficient time in the separate zone and heated to a sufficient temperature to substantially refine the material.

* * * * *